United States Patent [19]

Gartshore et al.

[11] Patent Number: 5,114,487
[45] Date of Patent: May 19, 1992

[54] CEMENTITIOUS COMPOSITION AND MAKING CONCRETE THEREFROM

[75] Inventors: Gavin C. Gartshore, Sevenoaks; Norman E. Holme, Wilmslow Cheshire, both of United Kingdom

[73] Assignee: Blue Circle Industries PLC and ALH Systems Limited, United Kingdom

[21] Appl. No.: 646,155

[22] Filed: Jan. 25, 1991

[30] Foreign Application Priority Data

Jan. 26, 1990 [GB] United Kingdom ............. 9001799

[51] Int. Cl.⁵ .................. C04B 7/32; C04B 11/28
[52] U.S. Cl. ................... 106/695; 106/640; 106/643; 106/644; 106/696
[58] Field of Search .......... 106/692, 693, 695, 640, 106/643, 644, 735, 696

[56] References Cited

U.S. PATENT DOCUMENTS

| | | | |
|---|---|---|---|
| 3,155,526 | 11/1964 | Klein | 106/735 |
| 3,251,701 | 5/1966 | Klein | 106/735 |
| 3,857,714 | 12/1974 | Mehta | 106/735 |
| 3,973,978 | 8/1976 | Nakagawa et al. | 106/694 |
| 4,082,561 | 4/1978 | Nakagawa et al. | 106/695 |
| 4,377,977 | 3/1983 | Wurster | 106/694 |
| 4,419,136 | 12/1983 | Rice | 106/695 |

FOREIGN PATENT DOCUMENTS

| | | |
|---|---|---|
| 0181739 | 10/1985 | European Pat. Off. . |
| 0271329 | 12/1987 | European Pat. Off. . |
| 0353062 | 1/1990 | European Pat. Off. . |

OTHER PUBLICATIONS

107 Chemical Abstracts, 12:323, Tarake et al., (Sep. 1987), Reference No. 101698S "Glass Fiber-Reinforced Concrete Product Compositions" Hung. Teljes MU, 40:783 (Feb. 27, 1987).

83 Chemical Abstracts, 12:316 (Sep. 22, 1975) Reference No. 10-441A, Hasaba, Shigemasa et al., "Properties of Concrete Mixed With Sea Water", Zairyo, 24(260):425-431 (1975).

113 Chemical Abstracts 6:288 (Aug. 6, 1990) Reference No. 4538v, Takano et al., Kokai 01,290,543 "Rapid-Setting Cement Usable for Low-Temperature Curing".

*Primary Examiner*—William R. Dixon, Jr.
*Assistant Examiner*—Anthony J. Green
*Attorney, Agent, or Firm*—Dressler, Goldsmith, Shore, Sutker & Milnamow

[57] ABSTRACT

A cementitious composition comprises a ground sulfoaluminous clinker, a ground Portland cement clinker (preferably rapid hardening Portland cement clinker), calcium sulfate, aggregate (especially sand and a coarse aggregate such as granite) and metal (e.g. stainless steel) fibers. The composition may also comprise a plasticiser and agents for controlling setting and hardening. The reinforced concrete produced from the compositions is useful in offshore applications, e.g. as a coating for the weld areas between lengths of steel pipe to be laid under water.

16 Claims, No Drawings

CEMENTITIOUS COMPOSITION AND MAKING CONCRETE THEREFROM

FIELD OF THE INVENTION

The present invention relates to a cementitious composition suitable for applications requiring high impact resistance and extremely rapid setting and strength development—such as tidal zone concreting where resistance to, e.g., ship impact is required or coating the weld area between joined lengths of steel piping to be laid under water—and to a method of producing a reinforced concrete from such a cementitious composition.

BACKGROUND OF THE INVENTION

Steel pipes laid underwater, particularly in the sea, are currently used for carrying oil obtained from marine oil wells or for carrying other liquids and gases. These pipes, which typically have outside diameters of from 12 inches (30.5 cm) to 48 inches (121.9 cm), are manufactured in sections, generally 40 foot (12.2 m) lengths, and are generally provided with a reinforced concrete coating. The function of the pre-formed concrete coating on the steel pipes is not so much to protect them from corrosion (since the steel piping is provided with its own corrosion protection) as to weigh the pipes down on the sea-bed and to protect the pipes against impact damage, such as might be caused by a colliding trawler board. It has been estimated that a pipe joint may receive, on average, five such impacts during the expected lifetime of the pipe.

The sections of pipe are welded together, to form a pipeline, on a so-called "lay barge" and the uncoated area is protected by the application of either a marine mastic asphalt or a resin-based composition. In general, the procedure on the lay barge comprises the steps of welding together two lengths of pipe; conducting an X-ray inspection of the weld; placing a mould around the welded joint; filling the mould with the protective material; if appropriate, stripping off the mould; and passing the welded pipe over the "stinger" (a device comprising rollers situated at the stern of the barge) and into the sea.

The materials used hitherto for protecting the weld areas have certain disadvantages. Thus, marine mastic asphalt must be heated, which not only increases the cost of the operation but also generally requires the mould to go into the sea in place because the mastic does not cool down sufficiently in time to allow demoulding. The moulds can be hazardous on the sea-bed, since they may snag fishing lines or the like. The resin-based systems can be placed in reusable moulds that can be removed about 10 minutes after filling but give rise to environmental disadvantages: in particular, one of the starting materials contains isocyanate and must not be allowed to go overboard. Furthermore, the mixing and placing equipment used with the resin-based systems has to be flushed with solvents after each moulding operation, thereby giving rise to additional environmental and explosion risks as well as inconvenience during operations.

In order to improve operational efficiency, and to reduce the hazards associated with the prior art, it would be desirable to employ a protective material that fulfils the following requirements, namely a material that does not require heating to elevated temperatures; that does not entail the use of large quantities of toxic resins or flammable solvents; that can be placed readily in a mould and that allows the mould to be stripped off within a period of about 6 minutes; that attains sufficient flexural and compressive strength within about 10 minutes after the filling of the mould to be passed over the stinger; and that attains a sufficient strength to withstand an impact test as used by the Corrosion and Protection Centre Industrial Service (CAPCIS) at the University of Manchester Institute of Science and Technology (UMIST), which test involves an impact with a swung 2.68 tonne chisel-ended weight at 7 knots (13 km/h). 2.68 tonnes is the current maximum weight of a trawler gate and 7 knots is the maximum speed at which it is currently permitted to travel.

It is believed that no previously known hydraulic cement-based compositions would have the required rapid setting and strength development, the required impact resistance, and the ability to meet other demands of the above-described use. Thus, the concrete mix would need initially to be sufficiently flowable to permit satisfactory filling of the mould placed around the pipe joint. The concrete would also need to withstand the severe thermal stresses due to emplacement around a pipe joint still hot (typically 110°–120° C.) from the welding operation followed by immersion shortly afterwards in cold seawater (typically 5° C.): conventional concrete subjected to such a thermal shock would be expected to undergo multiple cracking and to lose quickly its integrity.

The concrete should exhibit shrinkage properties compatible with those of the freshly welded steel pipe, which will cool quickly upon entry into the sea; furthermore the concrete should be dimensionally stable despite immersion in seawater.

U.S. Pat. No. 4,377,977 (Wurster) discloses a moldable, uniform mixture comprising 120–190 parts by weight of silica sand aggregate, 40–65 parts of metal fibre, in particular steel fibre, 80–175 parts of an expansive cement containing a Portland Cement and an expansive component, and 30–75 parts of water, said mixture having a slump of about 5.5 to about 6.5 inches (140-165 mm). The concrete obtained upon curing the said mixture can withstand an attack with an acetylene torch without flaking, spalling or exploding and is also resistant to attack with a hammer, chisel, drill or cutting implement; the said concrete is therefore suitable for incorporation in a safe or vault structure. Other materials, such as granite chips or a combination of latex binder and glass fibre may also be included in order to improve impact resistance. The said expansive component must be present in an amount that is at least sufficient to compensate for the shrinkage of the said Portland cement and to impart expansive and self-stressing properties to the Portland cement when the said component is hydrated upon curing: preferably, the expansive cement contains 90–70% of Portland cement and 10–30% of an expansive component consisting for the most part of calcium sulfoaluminate ($C_4A_3\bar{s}$) in the form of a ternary system with extractable associated lime (CaO) and extractable associated anhydrous calcium sulfate ($CaSO_4$). This U.S. patent indicates that a preferred expansive, shrinkage-compensating cement is that disclosed in U.S. Pat. Nos. 3,155,526 and 3,251,701.

The characteristics exhibited by the concrete mixes disclosed by Wurster render them unsuitable for the preferred use of the compositions of the present invention. Thus, Wurster's compositions are required to have the stated slump values in order to ensure that the mouldable mixture can be vibrated into various cavities and interstices of the safe cavity (U.S. Pat. No. 4,377,977, column 7, lines 7-10 and 18-33); such characteristics would be unsuitable for coating the weld areas of steel piping to be laid in the sea, where demoulding has to be effected within a very short span of time. Furthermore, Wurster's compositions undergo an expansive reaction in the first few days of concrete curing (U.S. Pat. No. 4,377,977, column 6, lines 47-48); however, such expansion in a pipe weld coating could cause separation of that coating from the steel piping (which would have contracted upon cooling) thereby considerably weakening the whole structure and reducing the corrosion resistance.

SUMMARY OF THE INVENTION

The present invention provides a cementitious composition which comprises (a) a ground sulfoaluminous cement clinker; (b) a ground Portland cement clinker; (c) calcium sulfate; (d) aggregate; and (e) metal fibre. Usually, the composition will also comprise (f) a plasticiser and/or (g) a setting and/or hardening accelerator for the cementitious components and/or (h) a set-controlling agent.

The present invention also provides a method of producing a reinforced concrete which comprises mixing the cementitious composition with water and allowing the resultant mixture to set. In certain preferred embodiments, there is provided a method of producing a protective coating around the weld area between welded lengths of steel pipe, which method comprises placing the said weld area in a mould, filling the remaining mould space with a cementitious composition according to the invention that has been gauged with water, and removing the mould when the said composition has set sufficiently for it to remain coherent.

In addition to providing compositions that can fulfil the above-mentioned requirements despite off-shore working conditions, the present invention also permits the use of sea water for gauging purposes.

DESCRIPTION OF PREFERRED EMBODIMENTS

By "sulfoaluminous cement clinker" in the context of component (a) there is meant any mineral clinker that comprises the phase $4CaO.3Al_2O_3.SO_3$, which is known as Klein's compound and which may also be represented by $3CaO.3Al_2O_3.CaSO_4$ or $C_4A_3\bar{s}$. Certain clinkers containing Klein's compound, their production and their use as expansive agents in Portland cement compositions are known: see U.S. Pat. No. 3,155,526 (Klein), U.S. Pat. No. 3,251,701 (Klein), U.S. Pat No. 3,857,714 (Mehta) and U.S. Pat. No. 4,419,136 (Rice), the teaching in which United States patents is incorporated herein by reference.

The expansion and shrinkage-compensating properties of the sulfoaluminous clinkers described in the aforesaid U.S. patents are due to excess free lime and free calcium sulfate. However, such properties are not desirable in coatings for welded pipe joints; in fact, it seems desirable for controlled shrinkage to occur in order to accommodate the contraction of the steel pipe as it cools after welding. Accordingly, the preferred sulfoaluminous clinkers for use in the present invention are those containing at least 15% by weight of $C_4A_3\bar{s}$, 0 to 6% by weight of free lime, 0 to 25% by weight of $CaO.2Al_2O_3(CA_2)$, 0 to 10% by weight of $12CaO.7Al_2O_3(C_{12}A_7)$, 0 to 5% by weight of $CaO.TiO_2(CT)$, 0 to 10% by weight of ferrite phase (of the approximate composition $4CaO.Al_2O_3.Fe_2O_3$ or $C_4AF$), 0 to 60% by weight of $CaO.Al_2O_3(CA)$, and 0 to 30% by weight of a $CaSO_4$ $(C\bar{s})$ phase. In principle, silica, $SiO_2$, could be absent from the mineral clinker but in practice some will usually be present due to impurities in the raw materials from which the clinker is manufactured. Any $SiO_2$ in the clinker should preferably be combined to form $2CaO.Al_2O_3.SiO_2(C_2AS)$ and/or $2CaO.SiO_2(C_2S)$. Preferably, the clinker contains less than 10% by weight of $SiO_2$ (corresponding to a content of less than 45.6% by weight of $C_2AS$), more preferably less than 5% by weight of $SiO_2$. To obtain maximum control with regard to the free lime and the calcium sulfate it is preferred to use sulfoaluminous clinkers and a method for their production as described in EP-A-0,181,739, the teaching in which European patent specification is incorporated herein by reference.

The preferred sulfoaluminous clinkers contain at least 25%, but usually not more than 85%, by weight of $C_4A_3\bar{s}$. The particularly preferred amounts of that phase are in the range from 35 to 68% by weight of the sulfoaluminous clinker.

It is also preferred that the sulfoaluminous clinker should contain less than 20% by weight of CA; less than 1%, more preferably less than 0.5% and especially less than 0.2%, of free lime; less than 5% by weight of $C_{12}A_7$ and less than 4.1%, especially less than 1%, by weight of a $CaSO_4$ phase. It is also preferred that in the sulfoaluminous clinker the content of $CA_2$ should be less than 5% by weight and the content of $C_4AF$ should not be over 5% weight.

It will be understood, of course, that the sulfoaluminous clinker may also contain a small amount of other components, eg. $Mn_2O_3$, $P_2O_5$, MgO, $K_2O$, $Na_2O$ and loss on ignition.

Preferably, the sulfoaluminous cement clinker is ground to a fineness equivalent to a specific surface of at least 350 $m^2$/kg, preferably at least 450 $m^2$/kg. This is in-contrast to conventional expansive or shrinkage-compensating cements that contain $C_4A_3\bar{s}$, which are normally marketed with a fineness of 250-270 $m^2$/kg. The coarser grinds can be utilised in the present invention, given a sufficiently finely ground Portland cement.

A suitable sulfoaluminous clinker is available commercially in a ground form from Messrs. Blue Circle Industries Plc. under the trade name "Rockfastk" (previously available under the trade name "Calumex").

In the absence of lime and calcium sulfate, $C_4A_3\bar{s}$ has been shown to be only very weakly hydraulic. However, in the presence of lime and calcium sulfate the $C_4A_3\bar{s}$ reacts rapidly to form ettringite.

In accordance with the present invention, a Portland cement clinker (b) is used as a source of lime (CaO) and to produce the essential calcium silicate hydrates to form the durable concrete structure necessary for this invention. Although a Portland cement clinker of normal fineness can be used, it is preferred to employ a clinker that has been ground to a fineness equivalent to a specific surface of at least 400 $m^2$/kg. More preferably, the ground Portland cement clinker has a fineness equivalent to a specific surface of at least 450 $m^2$/kg up to 550 $m^2$/kg or even higher. Thus, cement clinkers, such as those known under the trade name "Microcem", that have a fineness equivalent to a specific surface of 450±25 $m^2$/kg up to 1,000 $m^2$/kg will certainly come into consideration (although at the higher levels of fineness, it may be difficult to produce commercial quantities in an economical manner). Where Portland cement clinker of normal fineness is employed it is generally then necessary to use higher quantities of calcium sulfoaluminate clinker.

Preferred Portland cement clinkers for use in the present invention satisfy the requirement for Portland cement in ASTM Standard C150:1989 or British Standard BS12:Part 2:1971, but generally have a fineness markedly greater than the minimum specified in either Standard. A rapid hardening Portland cement, e.g., Type III, as defined in either Standard is preferred, and generally has a specific surface of at least 325 m²/kg.

Typically, the present cementitious compositions contain from 1 to 5 parts by weight of component (b) to 1 part by weight of component (a).

Commercially available calcium sulfoaluminate clinker may contain calcium sulfate in the form of an anhydrite phase or a calcium langbeinite phase (it being possible for such phases to be "burned into" the clinker) and this may be used as the source of at least some, and possibly all, of the calcium sulfate (c) although it is not the preferred means of incorporating that material. It is preferred that at least 50% by weight, and particularly preferably all, of the calcium sulfate be in the form of anhydrite, especially $\beta$-anhydrite; the remainder when added may be in the form of gypsum, soluble anhydrite or plaster. Preferably, the calcium sulfate is ground to a particle size of less than 250 μm. Commercially available Portland cements may contain calcium langbeinite and/or an addition of gypsum and these too may be used as the source of at least some of the calcium sulfate.

Typically, the present cementitious compositions contain from 0.25 to 0.5 parts by weight of component (c) to 1 part by weight of component (a), allowance to be made, of course, for any calcium sulfate within the sulfoaluminous clinker.

The compositions of this invention may contain as component (d) both a fine aggregate and a coarse aggregate. A suitable fine aggregate is siliceous sand, as conventionally used in concrete compositions. The coarse aggregate must be of a sufficient hardness to meet the impact resistance requirements and particulate siliceous aggregate has been found to be particularly suitable; especially granite and andesite. The size gradings of both the fine and coarse aggregates are preferably selected to provide maximum particle packing; typically, the fine aggregate is in the size range 90 to 1000 microns (0.09 to 1.0 mm) and the coarse aggregate 1 to 10 mm. This type of aggregate will give a concrete with a typical bulk density of 2300 kg/m³. For submersible pipelines there can be a requirement for a higher density infill. In this case, inert iron oxide aggregate in the size range 1 to 6 mm has been found to be suitable to produce a concrete with a typical bulk density of 2600 kg/m³. Barium sulfate may also be considered as high density coarse aggregate. These high density aggregates can, of course, be used in conjunction with granite and the like.

As a guide, the coarse aggregate, if not granite, preferably has a specific gravity at least comparable to that of granite, e.g. 2.55–2.65 or higher. Similarly, the coarse aggregate, if not iron oxide, preferably has a Moh's hardness at least comparable to that of natural iron oxide mineral, e.g. 5–6.5 or higher.

Typically, the present compositions contain from 1 to 4 parts by weight of fine aggregate and from 4 to 8 parts by weight of coarse aggregate per part of component (a).

The compositions of the present invention are fibre-reinforced. The metal fibre (e) must be of sufficient strength to meet the impact resistance requirements and not be prone to excessive corrosion when embedded in mix according to the invention over the normal life of the pipeline. In general, ferrous metal fibres are used; stainless steels and low carbon steels have been found to be particularly suitable. Preferably, the average metal fibre length is greater than the maximum particle size of the aggregate; typically fibre lengths of 15 to 45 mm may be used and a length of 25 mm has been found to be particularly suitable. The aspect ratio of the fibres and indeed their shape can be varied widely: thus, for example, straight, hooked or crimped fibres come into consideration. The range of fibre quantities in the mix can be varied within the range of 1.0 to 5% (by weight of the total composition on a dry basis) and a range of 1.5 to 3.5% has been found to be particularly suitable. Steel fibres for inclusion in concrete are described in Steel Fiber Concrete: US-Sweden joint seminar, Stockholm 1985, ed. by S. P. Shah and A. Skarendahl (Elsevier), the teaching in which is incorporated herein by reference. However, the present invention is not limited to the specific fibres discussed in that literature.

It has been found that the incorporation of a plasticiser (f) in order to allow a reduction in water requirement and thereby produce concrete compositions of high strengths is essential where extremely rapid setting and hardening is required and is preferably incorporated in other applications of this invention. Plasticisers, by decreasing the water requirement, also permit the production of concrete having increased density and increased resistance to corrosion. Any plasticiser known in the art may be considered for use in the invention but superplasticisers are particularly preferred, e.g. those selected from sulfonated melamine formaldehyde condensates, sulfonated naphthalene formaldehyde condensates, modified lignosulfonates, sulfonic acid esters and sulfonated polystyrene. The plasticiser is usually used in an amount of from 0.25 to 1% by weight relative to the total composition (dry basis).

Preferred hardening and/or setting accelerators (g) are the salts, e.g. the carbonates, of the alkali metals, in particular sodium, potassium and especially lithium. Similarly to the calcium sulfate these salts may be burned into the calcium sulfoaluminate clinker in a quantity up to 5% and most preferably up to 2% (by weight of the total composition on a dry basis), thus obviating the need for a separate addition. It is normally preferred, however, to add these materials to the mix during mixing to give maximum control of the setting and hardening processes. These materials have the useful property of remaining inactive during the first few minutes after mixing thus allowing the set controlling and plasticising agents to exert their desired action and then overiding these effects once the setting and hardening processes commence.

The compositions of this invention will preferably contain a set-controlling agent (h), preferably a hydroxycarboxylic acid and most preferably citric acid, in order to prevent instant setting of the composition when mixed together but not to interfere with the desired setting and hardening processes of the cementitious material and the hardening and/or setting agents. The preferable range of addition of this material will lie between 0.01 to 0.02% (by weight of the total composition on a dry basis).

It will be understood, of course, that any of the components (a) to (h) may be constituted by a mixture of materials of the appropriate description.

The compositions may include other components, provided that the ability of the composition to meet the above-discussed requirements is not impaired. Optional components that may come into consideration include alkali metal sulfates (to promote the formation of ettringite) and extenders, for example silica fume and such hydraulic extenders as pulverised fly ash, ground granulated blast-furnace slag and pozzolanic materials (which hydraulic extenders may act, after the initial hydration of the main cementitious components, to remove by reaction any remaining free lime). Silica fume has the additional advantage of acting as a densifying agent to assist in the prevention of the passage of corrosive salts into the concrete.

The compositions of the present invention are generally provided as dry compositions, which are mixed with water on site. The present compositions are surprisingly effective, despite the intended offshore working conditions, and a further advantage is that sea water may be used for gauging. Thus, for example, if the initially required placed tonnage were 75,000t, one could supply 7,000t of this as water on site, since the gauging water does not need to be shipped out. Furthermore, sea water can be used to flush out the mixing and placing equipment. The amount of water added for the compositions should not, of course, be too little or too much. However, determining an appropriate amount should be well within the competence of the skilled person and, as shown hereinafter, the present compositions are surprisingly tolerant of variations from the optimum level of addition of water. Using the composition of the present invention for coating pipe welds, it is possible to place 0.7t per joint within 2 minutes without undue inconvenience, such a rate being considered important for efficient operations.

The pipe welds will commonly have the corrosion protection applied soon after welding and the coating of the present invention will then be applied, normally whilst the pipe join is still at a high temperature, typically 110°–120° C. It is surprising that the compositions of the present invention can be used successfully under such circumstances, particularly when it is remembered that the hydration of cement also produces heat, and the quicker and more rapid the hydration, and hence development of strength, the greater is the heat output. The use of a rapid setting cement generating such heat and which has been placed on a hot pipe and then passed within a short period of time into very cold water is one of the worst examples of thermal shock that might be encountered in practice. However, the present method can also be successfully applied when the pipes have cooled down, as may occur when work is interrupted. It may be found to be advantageous to heat the gauging water to about 20°–35°C. before it is mixed with the dry composition.

It is surprising that a cementitious composition can be used to fulfil the requirements of this invention including the production of a smooth and strong moulding with conventional equipment. The production of a smooth moulding is desirable to prevent the snagging of fishing lines or the like and to allow the undisturbed passage of a sensor carriage along the surface of the pipeline. The presence of the fibres has not been found to give rise to a problem of surface irregularities. An additional advantage over other jointing materials is that a cementitious system facilitates the production of a monolithic bond with the existing concrete coating; indeed a test carried out 30 minutes after demoulding showed that the coating fractured preferentially at the existing coating rather than at the joint.

The present compositions set so rapidly that it is not possible to measure a slump value. Accordingly, it is appropriate to mix the gauging water with the dry compositions as close to the mould as possible. Shotcreting allows the last moment mixing of cement and water but essential to that particular application is the unusual but known feature of utilising a cyclone to eliminate the air from the mix. Air is usually eliminated in shotcreting when the mix hits the open, hard surface but the unconventional use of shotcreting into a closed mould necessitates this feature. The production of dust can be a problem with shotcreting and an alternative system entails the feeding of the dry composition from a hopper, by means of a screw feeder, into a pipe directed to the entry port of the mold. In this embodiment and in the shotcreting embodiment, the water is advantageously introduced under pressure through an annulus fitted to the delivery pipe just prior to discharge into the mould.

The dimension of the mould will depend upon the size of the pipe, the thickness of the preformed concrete coating (since the coating on the welded area should ideally joint smoothly to the preformed coating) and the length of pipe exposed for welding. Typically the coating is up to 6 inches (15.25 cm) thick in the radial direction and the exposed length to be coated by means of the present invention is typically about 3 feet (0.915 m).

In order to prevent voids in the concrete that could give rise to weaknesses in the product, it is generally important to ensure that air is not trapped in the mould during filling. This may be accomplished by vibration: thus, it is appropriate to vibrate the mould when coating weld joins as described above, although in other applications of the present compositions other means, e.g. vibration rods, may be used to vibrate the mix.

The present invention is illustrated in and by the following examples. In these, vibration was employed, as discussed above, to avoid trapping air in the moulds.

EXAMPLE 1

A base mix, optimised for strength and speed of setting, was prepared by thoroughly mixing together the following ingredients.

|  | % by weight |
|---|---|
| Rapid Hardening Portland Cement (1) | 34.470 |
| Ground sulfoaluminous clinker (2) (5) | 16.114 |
| Anhydrite | 5.390 |
| Sand | 42.020 |
| Melment F10 Superplasticiser (3) | 1.690 |
| Lithium carbonate | 0.290 |
| Citric acid (4) (5) | 0.026 |
|  | 100. |

A dry cementitious composition was prepared by thoroughly blending together the following:

|  | kg |
|---|---|
| Base mix | 500 |
| Granite aggregate 1–5 mm | 500.00 |
| 25 mm stainless steel fibre | 30.00 |
|  | 1030 |

The dry cementitious composition of the above formulation, which had a bulk density of 2,300 kg/m³, was delivered by means of a conventional Shotcrete machine at a rate of 320 kg/min to a mixing head where water was introduced. The amount of water required for acceptable consistency was typically between 9.3% and 11.7% by weight of total solids. The resultant aqueous mixture was fed through a short pipe to a cyclone wherein the carrier air from the dry delivery was removed. The aqueous composition was then delivered to a mould. It was found that 0.6 t of the aqueous cement mixture could be placed within 1.5 minutes repeatedly, with comparatively little cleaning out required.

EXAMPLE 2

A dry cementitious composition was prepared by mixing thoroughly the following components:

| | |
|---|---|
| Base mix (as in Example 1) | 48.5% wt. |
| Granite aggregate (10 mm) | 48.5% wt. |
| Stainless steel fibres (25 mm) | 3.0% wt. |

The above composition was gauged with water that had been preheated to 20° C. The gauged mixture was subjected to high shear in a Hobart (trade mark) mixer for 1 minute and was then placed in moulds that had been preheated to 50° C. in order to simulate weld joint temperatures. The specimens were demoulded after five minutes had elapsed and were immersed in water after 10 minutes had elapsed.

Tests were carried out using an addition of water of 11.65% by weight relative to the dry cementitious composition. This rate of addition was considered optimum but further tests were conducted using amounts of water either one-tenth less or one-tenth more than the optimum, in order to investigate the tolerance of the composition to variations in the amount of water added.

Two series of tests were carried out, using tap water and a simulated seawater respectively. Additional tests were also carried out using moulds that had not been preheated. The results are summarised in Table I hereinafter, from which it will be seen that the optimum mix was satisfactory with regard both to its tolerance to variations in water addition and to the use of seawater.

Further amounts of the mix containing the optimum addition of water were cast into bars of dimensions 1 inch (2.54 cm)×1 inch (2.54 cm)×11 inches (27.94 cm). The bars were moist cured for 24 hours and then water-cured for 48 hours. The bars were then tested for shrinkage upon drying in air, in order to provide an indication of the ability of the resultant concrete to maintain an integral join with existing concrete in such applications as the protection of weld areas in concrete-coated steel pipes. The results are summarised in Table II hereinafter from which it will be seen that a satisfactory compensation for shrinkage was obtained.

EXAMPLE 3

A number of formulations, as described below, were prepared and were cast into slab samples having dimensions of 10 inches (25.4 cm)×10 inches (25.4 cm)×2 inches (5.08 cm). The formulations contained, variously, either no aggregate or an aggregate selected from Prodorite Filler (iron oxide), 1–5 mm granite aggregate or 5 mm blue limestone. Furthermore, the formulations contained, variously, either no fibre or a fibre selected from 25 mm stainless steel ("S/S") fibre or 12 mm polypropylene ("P/P") fibre. In all cases, the "base mix" was as described in Example 1.

| | | |
|---|---|---|
| Sample 1. | Base mix | 5.22 kg |
| | Prodorite Filler | 2.78 kg |
| | Water | 0.932 kg |
| Sample 2. | Base mix | 5.22 kg |
| | Prodorite Filler | 2.78 kg |
| | 25 mm S/S Fibre | 0.24 kg |
| | Water | 0.984 kg |
| Sample 3. | Base mix | 4.0 kg |
| | (1–5 mm) Granite Agg. | 4.0 kg |
| | 25 mm S/S Fibre | 0.24 kg |
| | Water | 0.959 kg |
| Sample 3 was adjudged to be too wet. | | |
| Sample 4. | Base mix | 4.0 kg |
| | (1–5 mm) Granite Agg. | 4.0 kg |
| | 25 mm S/S Fibre | 0.24 kg |
| | Water | 0.755 kg |
| Sample 5. | Base mix | 4.00 kg |
| | 1–5 mm Granite Agg. | 4.00 kg |
| | 25 mm S/S Fibre | 0.4 kg |
| | Water | 0.78 kg |
| Sample 6. | Base mix | 4.00 kg |
| | 5 mm Blue Limestone | 4.00 kg |
| | 25 mm S/S Fibre | 0.24 kg |
| | Water | 0.8 kg |
| Sample 7. | Base mix | 4.00 kg |
| | 5 mm Granite Agg. | 4.00 kg |
| | 25 mm S/S Fibre | 0.24 kg |
| | Water | 0.785 kg |
| Sample 8. | Base mix | 4.00 kg |
| | 1–5 mm Granite Agg. | 4.00 kg |
| | 12 mm P/P Fibre | 0.04 kg |
| | Water | 1.07 kg |
| Sample 8 proved to be difficult to mix and place. | | |

These samples were sealed in plastic bags, stored at ambient temperature and employed for impact testing after 20–22 hours.

Testing was conducted on the Yarsley Falling Weight Impact Tester (the CAPCIS test being inappropriate for laboratory-scale testing). Each sample was initially subjected to a single impact in the centre of the specimen, with the following results:

Sample 1. Sample cracked and broke—very brittle.
Sample 2. Remained integral—no cracking.
Sample 3. Remained integral—no cracking. High deflection indicating relative softness, possibly due to high water addition.
Sample 4. Integral—no cracking.
Sample 5. Integral—no cracking.
Sample 6. Integral—no cracking—high deflection, relatively soft.
Sample 7. Integral—no cracking.
Sample 8. Integral—no cracking—high deflection, relatively soft.

Samples 2, 4 and 8 were then subjected to four further impacts radially from the initial centre impact. Sample 2 showed no distress, sample 4 exhibited hair-line cracks, and sample 8 exhibited 1 hair-line crack.

Then each sample was subjected to further impacts in the centre. Sample 2 showed 1 transverse crack after 6 impacts but remained integral owing to steel fibre bonding. Sample 4 showed 3 cracks after 6 impacts but remained integral owing to fibre bonding. Sample 8 showed 1 crack after 3 impacts and the chisel had fully penetrated the specimen.

It was concluded that a 3% by wt. stainless steel fibre addition improved impact performance and allowed the specimens to remain integral after failure (an important criterion in field performance). The Prodorite (iron oxide) filler was superior to granite as aggregate. The Blue Limestone aggregate was regarded as too soft; similarly the use of polypropylene fibres produced a soft matrix.

EXAMPLE 4

Slabs similar to those described in the preceding Example were prepared from a mix comprising 4 kg of the base mix described in Example 1, 4 kg of FLINTAG aggregate (1-6 mm flint) and 0.8 kg water, into which mixture was incorporated a variable amount of stainless steel fibre (25 mm).

The slabs were subjected to impact testing, following the regime of 1 impact in the centre, 4 radial impacts followed by further impacts in the centre either to a maximum of 5 such impacts or until the slab was punched through.

The slabs comprising stainless steel fibre in an amount of 3%, 2.5%, 2.0% or 1.5% (by weight of the total composition on a dry basis), although showing cracks, remained integral even when punched through. A slab containing only 1% stainless steel fibre, however, showed cracks across and through the slab after the first radial impact which widened with subsequent impacts, the slab breaking into 3 pieces upon the next centre impact.

EXAMPLE 5

Slabs were prepared from a mixture comprising 4 kg of the base mix described in Example 1, 4 kg of aggregate and 0.8 kg water, into which wet mixture was incorporated 3% (by weight of the total composition on a dry basis) of stainless steel fibre (25 mm). Two series of tests were carried out using, respectively, 6 mm granite or 10 mm granite as the aggregate.

The slabs were subjected to an impact testing regime as described in the preceding Example.

Both types of slab withstood the first centre and the four radial impacts. Slabs containing 6 mm granite showed a hair-line crack on the fourth subsequent centre impact and were punched through, with four cracks showing upon the fifth impact but remained integral, whereas the 10 mm granite-containing slab showed one crack after the third centre impact following the radial impacts, showed three cracks upon the fourth such centre impact and was punched through on the fifth such impact but also remained integral.

EXAMPLE 6

Mild or low-carbon steel may be substituted on an equal weight basis for the stainless steel fibres in the compositions according to the present invention as disclosed in any of the preceding Examples, and the resulting compositions perform satisfactorily, especially in terms of flexural, compressive and impact strength. Somewhat surprisingly, the use of mild, rather than stainless, steel fibre is also considered to be acceptable in terms of corrosion resistance under the intended conditions of use.

EXAMPLE 7

The steel fibres used in the preceding Examples were of cylindrical cross-section, the diameter being about 0.25 mm. However, such fibres may be replaced satisfactorily by, for example, steel fibres having a length of 25 mm, a thickness of about 0.20 mm, a width of about 3 mm, with a half-twist and crimped about 2 mm from each end.

It will be understood that the cross-sectional and other geometry of the metal fibres that will come into consideration may vary. Fibres of rectangular cross-section offer an advantage in that more surface area is provided for a given fibre weight. As a guide, the metal fibres will commonly have a cross-sectional area of 0.01 to 2 mm$^2$, preferably 0.025 to 1 mm$^2$.

It will of course be understood that the present invention has been described above purely by way of example and that modifications of detail can be made within the scope of the invention.

The dependencies of the subsidiary claims hereinafter do not imply any limitation as to the possible combinations of the features mentioned in those claims: the optional and the preferred features of the invention revealed in the preceding description and in the claims can be of importance both individually and also in any combination for the implementation of the invention.

TABLE I

|  | Tap Water | | | Simulated Sea Water | | |
|---|---|---|---|---|---|---|
|  | −10% | Opt | +10% | −10% | Opt | +10% |
| Compressive N mm$^{-2}$ | water | | water | water | | water |
| 6 mins | — | 4.0 | — | — | 2.7 | — |
| 10 mins | 4.7 | 5.9 | 2.9 | 6.3 | 4.6 | 3.6 |
| 20 mins | 8.5 | 7.2 | 5.0 | 11.0 | 9.6 | 7.3 |
| 30 mins | 12.6 | 8.3 | 7.3 | 15.0 | 10.4 | 9.3 |
| 1 hour |  | 15.6 |  |  | 16.8 |  |
| 3 hours |  | 27.5 |  |  | 31.5 |  |
| 1 day |  | 47.6 |  |  | 49.9 |  |
| 3 days |  | 57.8 |  |  | 53.6 |  |
| 7 days |  | 52.5 |  |  | 55.3 |  |
| 28 days |  | 67.8 |  |  | 68.0 |  |
| Flexural |  |  |  |  |  |  |
| 10 mins | 1.4 | 1.7 | 0.7 | 1.7 | 1.0 | 1.3 |
| 30 mins | 3.6 | 3.0 | 2.4 | 3.6 | 2.7 | 2.6 |
| 1 day |  | 9.5 |  |  | 7.9 |  |
| 3 days |  | 9.1 |  |  | 10.8 |  |
| 7 days |  | 10.7 |  |  | 11.2 |  |
| 28 days |  | 12.2 |  |  | 12.2 |  |
| Moulds Unheated Compressive N mm$^{-2}$ |  |  |  |  |  |  |
| 15 mins | 0.8 |  | 1.5 | 1.0 |  | 1.1 |
| 20 mins | 2.6 |  | 2.2 | 2.3 |  | 1.5 |
| 30 mins | 5.6 |  | 3.2 | 5.0 |  | 3.3 |
| Flexural |  |  |  |  |  |  |
| 15 mins | 0.2 |  | 0.4 | 0.2 |  | 0.4 |
| 20 mins | 0.6 |  | 0.5 | 0.8 |  | 0.4 |
| 30 mins | 1.4 |  | 1.0 | 1.4 |  | 1.0 |

TABLE II

| Mixing Water | Tap Water | Simulated Sea Water |
|---|---|---|
| 7 days* | −0.007% | −0.015 |
| 14 days | −0.015 | −0.027 |
| 21 days | −0.017 | −0.034 |
| 28 days | −0.021 | −0.041 |

Mean of 3 bars
*days from casting

We claim:

1. A cementitious composition, which consists essentially of (a) a ground sulfoaluminous cement clinker; (b) 1 to 5 parts by weight, per part by weight of component (a), of a ground Portland cement clinker having a fineness equivalent to a specific surface of at least 450 m$^2$/kg; (c) 0.25 to 0.5 part by weight, per part by weight of component (a), of calcium sulfate; (d) 1 to 4 parts by weight, per part by weight of component (a), of fine aggregate and 4 to 8 parts by weight, per part by weight of component (a), of coarse aggregate; (e) ferrous metal fibre in an amount of 1 to 5%, by weight, of the total composition on a dry weight basis; (f) a plasticizer in an amount of from 0.25 to 1% by weight of the total composition on a dry weight basis; (g) a hardening or setting accelerator in an amount of up to 5% by weight of the composition on a dry weight basis; and (h) a set-controlling agent in an amount of 0.01 to 0.02% by weight of the total composition on a dry weight basis.

2. A composition according to claim 1, wherein component (a) is a clinker containing at least 15% by weight of $C_4A_3\bar{S}$, 0 to 10% by weight of $SiO_2$, 0 to 6% by weight of free lime, 0 to 25% by weight of $CA_2$, 0 to 10% by weight of $C_{12}A_7$, 0 to 5% by weight of CT, 0 to 10% by weight of ferrite phase, 0 to 60% by weight of CA and 0 to 30% by weight of a $CaSO_4$ phase.

3. A composition according to claim 2, wherein any $SiO_2$ present in the clinker is in a form selected from the group consisting of $C_2AS$, $C_2S$ and mixtures thereof.

4. A composition according to claim 1, wherein component (b) is a rapid hardening Portland cement.

5. A composition according to claim 1, wherein component (b) has a fineness equivalent to a specific surface of at least 550 m²/kg.

6. A composition according to claim 1, wherein at least some of component (c) is constituted by calcium sulfate within the sulfoaluminous cement clinker.

7. A composition according to claim 1, wherein component (c) is anhydrite.

8. A composition according to claim 1, wherein component (d) comprises both sand, as a fine aggregate, and particulate granite, as a coarse aggregate.

9. A composition according to claim 1, wherein component (e) is steel fibres having an average fibre length of 15–45 mm.

10. A composition according to claim 1, 2 or 8 in which the fine aggregate is in the size range 90 to 1000 microns and the coarse aggregate is in the size range 1 to 10 mm.

11. A composition according to claim 1, in which the plasticizer (f) is selected from the group consisting of sulfonated melamine formaldehyde condensate, sulfonated naphthalene formaldehyde condensate, modified lignosulfonate, a sulfonic acid ester and sulfonated polystyrene.

12. A composition according to claim 1, 2 or 11 in which the accelerator (g) is an alkali metal carbonate and the set-controlling agent (h) is a hydroxycarboxylic acid.

13. A composition according to claim 12, in which the accelerator (g) is lithium carbonate and the set-controlling agent (h) is citric acid.

14. A method of producing a reinforced concrete which comprises mixing a cementitious composition according to claim 1 with water and allowing the resultant mixture to set.

15. A method of producing a protective coating around the weld area between welded lengths of steel pipe, comprising the steps of placing the weld area within a mould having a mould space, filling the remaining mould space with a settable mixture of water and a cementitious composition according to claim 1, and removing the mould after the said settable mixture has set sufficiently to be coherent.

16. A method according to claim 10, wherein the said water is sea water.

* * * * *